(12) United States Patent
Hwang

(10) Patent No.: US 7,544,949 B2
(45) Date of Patent: Jun. 9, 2009

(54) METHOD FOR CONTROLLING ULTRAVIOLET LIGHT INFORMATION IN WIRELESS TERMINAL AND WIRELESS TERMINAL IMPLEMENTING THE SAME

(75) Inventor: Yong-Duk Hwang, Deagu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 14 days.

(21) Appl. No.: 11/397,712

(22) Filed: Apr. 5, 2006

(65) Prior Publication Data

US 2007/0041702 A1    Feb. 22, 2007

(30) Foreign Application Priority Data

Aug. 19, 2005   (KR) .................... 10-2005-0076300

(51) Int. Cl.
   *G01J 1/42*   (2006.01)
(52) U.S. Cl. .................................... 250/372
(58) Field of Classification Search ............. 250/372; 368/10, 11; 340/600; D10/46
   See application file for complete search history.

(56) References Cited

U.S. PATENT DOCUMENTS

| 4,985,632 | A | * | 1/1991 | Bianco et al. ............... 250/372 |
| 5,008,548 | A | * | 4/1991 | Gat ............................ 250/372 |
| 5,148,023 | A | * | 9/1992 | Hayashi et al. ............. 250/372 |
| 5,365,068 | A | * | 11/1994 | Dickerson .................. 250/372 |
| 5,387,798 | A | * | 2/1995 | Funakoshi et al. ....... 250/474.1 |
| 5,894,454 | A | * | 4/1999 | Kondo ......................... 368/11 |
| 6,541,775 | B2 | * | 4/2003 | Yagi ............................ 250/372 |
| D479,805 | S | * | 9/2003 | Tsai ............................. D10/46 |
| 6,936,824 | B2 | * | 8/2005 | Takada ........................ 250/372 |
| D528,933 | S | * | 9/2006 | Hunter et al. ................ D10/78 |
| 2004/0235431 | A1 | | 11/2004 | Jung et al. |
| 2005/0070327 | A1 | | 3/2005 | Watanabe |

FOREIGN PATENT DOCUMENTS

| CN | 1574662 | | 2/2005 |
| DE | 10120697 | | 11/2002 |
| EP | 0545887 | | 6/1993 |
| GB | 2336510 | | 10/1999 |
| JP | 2006071581 A | * | 3/2006 |
| KR | 20-0200807 | | 10/2000 |

\* cited by examiner

*Primary Examiner*—David P Porta
*Assistant Examiner*—Faye Boosalis
(74) *Attorney, Agent, or Firm*—Roylance, Abrams, Berdo & Goodman, LLP

(57) ABSTRACT

A method for controlling ultraviolet light information in a wireless terminal, and a wireless terminals are provided where, when an ultraviolet light measurement is selected in an ultraviolet light mode, whether a folder has been opened or closed is determined. When the folder has been closed, an amount of ultraviolet light is measured, and displaying both information on an ultraviolet index based on the measured amount of ultraviolet light and preset countermeasures for information on a user's skin type according to the ultraviolet index. Controlling ultraviolet light information in a wireless terminal may include measuring an amount of ultraviolet light in an ultraviolet light mode, and displaying corresponding information through an ultraviolet index based on the measured amount of ultraviolet light, displaying information on an ultraviolet index in the ultraviolet light mode, and displaying countermeasures against ultraviolet light in the ultraviolet light mode.

19 Claims, 17 Drawing Sheets

UV SENSOR
OPERATION

FIG.3C

3/02 WED 12:30 PM
UV INDEX : 3.9
NORMAL
OPEN FOLDER

METHOD FOR CONTROLLING ULTRAVIOLET LIGHT INFORMATION IN WIRELESS TERMINAL AND WIRELESS TERMINAL IMPLEMENTING THE SAME

PRIORITY

This application claims benefit under 35 U.S.C. § 119 from Korean Patent Application Serial No. 2005-76300 filed in the Korean Intellectual Property Office on Aug. 19, 2005, the entire contents of which are hereby incorporated by reference.

BACKGROUND OF THE INVENTION

1. Field of the Invention

The present invention relates to a method for controlling ultraviolet light information in a wireless terminal and a wireless terminal implementing the same. More particularly, the present invention relates to a method for controlling ultraviolet light information in a wireless terminal and a wireless terminal where information indicative of the amount of ultraviolet light measured by the wireless terminal is displayed, ultraviolet index information stored in the wireless terminal is displayed, and countermeasures against ultraviolet light are provided.

2. Description of the Related Art

Ultraviolet light is contained in, various light sources as well as sunlight. The radiation of ultraviolet light, which has wavelength far shorter than that of blue or purple visible light, is classified into ultraviolet-A (UVA) light, ultraviolet-B (UVB) light and ultraviolet-C (UVC) light. Ultraviolet-A light with a wavelength of about 320~400 nm is not absorbed by the ozone layer, whereas most ultraviolet-B light with a wavelength of about 280~320 nm is absorbed by the ozone layer, but some of the remaining ultraviolet-B reaches the Earth's surface. Ultraviolet-C light with a wavelength of about 100~280 nm is completely absorbed by the ozone layer.

Ultraviolet light has a sterilizing power. When ultraviolet light is irradiated into the human body, vitamin D is generated. However, ultraviolet-A light and ultraviolet-B light permeate the skin surface, thereby causing the skin to be burnt and increasing the frequency of occurrence of cutaneous cancer and cataracts. Therefore, ultraviolet-B light has bad influence on the human body. With the destruction of the ozone layer and the increase of ultraviolet light reaching the Earth's surface due to the destruction of the ozone layer, the danger to the human body relates to personal habits such as the degree to which the human body is exposed to the sun.

In order to commonly use information on the degree to which ultraviolet light has influence on the human body, the use of an ultraviolet index has been recommended, which may be simply and universally employed in the whole world.

An ultraviolet index represents the amount of ultraviolet-B radiation reaching the Earth's surface at its zenith during which the sun has a maximum altitude. An ultraviolet index may be classified into 10 levels. The level "0" represents the lowest danger for when the human body is exposed to the sun, and the level "9" represents the highest danger for when the human body is overexposed to the sun. An ultraviolet index provides both information on the expected danger to the human body's skin when the human body is overexposed to the sun, and information on to what degree people pay attention to the sun during outdoor activity.

An ultraviolet index may be classified into levels of very low (0~2.9), low (3~4.9), normal (5~6.9), high (7~8.9) and very high (above 9). When the ultraviolet index is very low, if the human body is exposed to the sun more than one hour and 50 minutes, reddening of the skin may occur. When the ultraviolet index is a low, if the human body is exposed to the sun more than one hour and 40 minutes, reddening of the skin may occur. When the ultraviolet index is a normal, if the human body is exposed to the sun more than one hour, reddening of the skin may occur. When the ultraviolet index is a high, if the human body is exposed to the sun more than 40 minutes, reddening of the skin may occur. When the ultraviolet index is a very high, if the human body is exposed to the sun more than 30 minutes, reddening of the skin may occur. The degree to which reddening occurs according to exposure time may also change depending on skin type as illustrated in FIG. 3f.

Since the stratosphere ozone amount and clouds have influence on the intensity of ultraviolet light reaching the Earth's surface, a meteorological administration forecasts an ultraviolet index in consideration of the change in the stratosphere ozone amount and the weather. A meteorological administration forecasts an ultraviolet index twice a day. The forecast at 06:00 AM represents an ultraviolet index of the current day, and the forecast at 18:00 PM represents an ultraviolet index of the next day.

As described above, a meteorological administration forecasts an ultraviolet index in advance. However, the meteorological administration does not frequently provide information on ultraviolet light changing according to the time. Therefore, it is impossible to properly cope with the fluctuation of ultraviolet light. Further, the meteorological administration provides approximate information including a wide area such as the Gangwon-province area and Seoul area. Therefore, when the information is applied to the actual location of interest, the accuracy of the forecast deteriorates.

SUMMARY OF THE INVENTION

Accordingly, certain exemplary embodiments of the present invention address the above-mentioned problems occurring in the prior art, and it is an object of certain exemplary embodiments of the present invention to provide a method for controlling ultraviolet light information in a wireless terminal and a wireless terminal where the amount of ultraviolet light in the wireless terminal is measured, and information indicative of the measured amount of ultraviolet light is displayed.

It is another object of certain exemplary embodiments of the present invention to provide a method for controlling ultraviolet light information in a wireless terminal and a wireless terminal where ultraviolet index information stored in the wireless terminal is displayed.

It is further another object of certain exemplary embodiments of the present invention to provide a method for controlling ultraviolet light information in a wireless terminal and a wireless terminal where countermeasure against ultraviolet light in the wireless terminal are provided.

In accordance with an exemplary aspect of the present invention, there is provided a method for controlling ultraviolet light information in a wireless terminal and a wireless terminal where, when an ultraviolet light measurement is selected in an ultraviolet light mode of the wireless terminal, whether a folder of the wireless terminal has been opened or closed is determined, when the folder of the wireless terminal has been closed, an amount of ultraviolet light is measured, and information on an ultraviolet index based on the measured amount of ultraviolet light and preset countermeasures for information on a user's skin type according to the ultraviolet index are displayed.

In accordance with another exemplary aspect of the present invention, there is provided a method for controlling ultraviolet light information in a wireless terminal and a wireless terminal where an amount of ultraviolet light in an ultraviolet light mode of the wireless terminal is measured, and corresponding information through an ultraviolet index based on the measured amount of ultraviolet light is displayed, information on an ultraviolet index, which is stored in the wireless terminal, in the ultraviolet light mode of the wireless terminal is displayed, and countermeasures against ultraviolet light in the ultraviolet light mode of the wireless terminal are displayed.

BRIEF DESCRIPTION OF THE DRAWINGS

The above and other objects, features and advantages of the present invention will be more apparent from the following detailed description taken in conjunction with the accompanying drawings, in which like reference numerals will be understood to refer to like parts, components and structures, where.

DETAILED DESCRIPTION OF EXEMPLARY EMBODIMENTS

Figure 1:
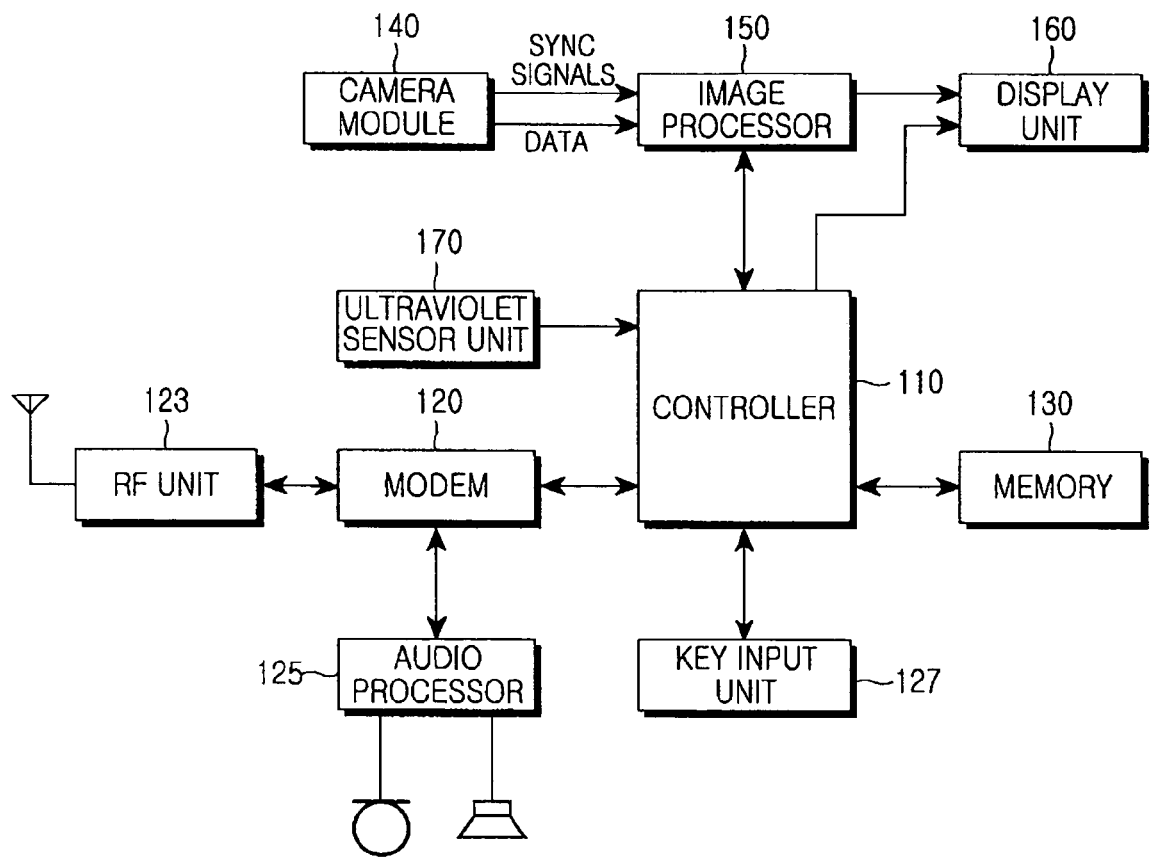
FIG. 1 is a block diagram illustrating the construction of a wireless terminal according to an exemplary embodiment of the present invention.

Certain exemplary embodiments of the present invention will be described in detail herein below with reference to the accompanying drawings. As noted above, the same reference numerals are used to designate the same elements as those shown in other drawings.

FIG. 1 is a block diagram illustrating the construction of a wireless terminal according to an exemplary embodiment of the present invention, which shows the construction of the wireless terminal equipped with a camera.

Referring to FIG. 1, a Radio Frequency (RF) unit 123 performs a wireless communication function of the wireless terminal. The RF unit 123 includes an RF transmitter for up-converting and amplifying the frequency of transmitted signals, an RF receiver for low-noise amplifying received signals and down-converting the frequency of the received signals, and so on. A modem 120 includes a transmitter for coding and modulating the transmitted signals, a receiver for demodulating and decoding the received signals, and so on. An audio processor 125 may include a codec. The codec includes a data codec for processing packet and other data, and an audio codec for processing audio signals such as voice. The audio processor 125 converts digital audio signals received through the modem 120 into analog signals through the audio codec for reproduction, or converts analog audio signals generated from a microphone into digital audio signals through the audio codec and transmits the digital audio signals to the modem 120. The codec may be separately provided or included in a controller 110.

A memory 130 may include a program memory and a data memory. The program memory may store programs for controlling general operations of the wireless terminal, and programs for providing various information based on an ultraviolet index according to the embodiment of the present invention. The data memory temporarily stores data generated during the execution of the programs. Further, the memory 130 can store information on the measured amount of ultraviolet light on a date and time basis according to the embodiment of the present invention.

The controller 110 performs a function of controlling the general operations of the wireless terminal, which may also include the modem 120 and the codec.

According to an exemplary embodiment of the present invention, the controller 110 controls the display of information (ultraviolet index information) on the amount of ultraviolet light measured through an ultraviolet sensor unit 170. The ultraviolet index information includes an ultraviolet index, levels (low, normal, high and very high) measured on a step-by-step basis according to the ultraviolet index, and life index information. The life index information displays required items according to the ultraviolet index by icons, and displays simple text descriptions about the items together with the icons.

Further, the controller 110 controls the display of the ultraviolet index information stored in the memory 130 according to an exemplary embodiment of the present invention. Furthermore, the controller 110 controls the display of countermeasures against ultraviolet light, for example a blocking method, a skin protection method, a recommended makeup method, and so on, according to an exemplary embodiment of the present invention.

The ultraviolet sensor unit 170 detects the amount and intensity of ultraviolet light and outputs electric current proportional to the detected intensity of ultraviolet light. The ultraviolet light information output through the ultraviolet sensor unit 170 is stored in the memory 130. The ultraviolet sensor unit 170 is installed on the outside of the wireless terminal folder according to the embodiment of the present invention.

A camera module 140 includes a camera sensor for photographing image data and converting photographed optical signals into electric signals, and a signal processor converts analog image signals photographed by the camera sensor into digital data. It is assumed that the camera sensor is a Charge-Coupled Device (CCD) sensor. The signal processor may be realized by a Digital Signal Processor (DSP). Further, the camera sensor may be integrated with the signal processor, or may also be constructed separately from the signal processor.

An image processor 150 generates screen data for displaying image signals output from the camera module 140. The image processor 150 processes the image signals, which are output from the camera module 140, by the frame, and outputs the frame image data according to the characteristics and sizes of a display unit 160. The image processor 150 includes an image codec, compresses the frame image data, which is displayed on the display unit 160, by a predetermined scheme, or restores the compressed frame image data into the original frame image data. The image codec may include a JPEG codec, an MPEG4 codec, a wavelet codec, etc. It is assumed that the image processor 150 has an On Screen Display (OSD) function, which may output on screen display data according to displayed screen sizes under the control of the controller 110.

The display unit 160 displays the image signals output from the image processor 150 on a screen, and displays user data output from the controller 110. The display unit 160 may use a Liquid Crystal Display (LCD). In this case, the display unit 160 may include an LCD controller, a memory capable of storing image data, an LCD display device, and do on. When the LCD has a touch screen function, the display unit 160 may also operate as an input unit. The display unit 160 displays ultraviolet index information, displays ultraviolet light information stores in the memory 130, and displays the countermeasures against ultraviolet light, according to the embodiment of the present invention.

A key input unit 127 includes keys for inputting number and character information and function keys for setting various functions. The key input unit 127 includes a hot key for measuring the amount of ultraviolet light according to the embodiment of the present invention.

Hereinafter, an operation for controlling ultraviolet light information in the wireless terminal as described above will be described in detail with reference to FIGS. 2 to 5.

Figure 2A:
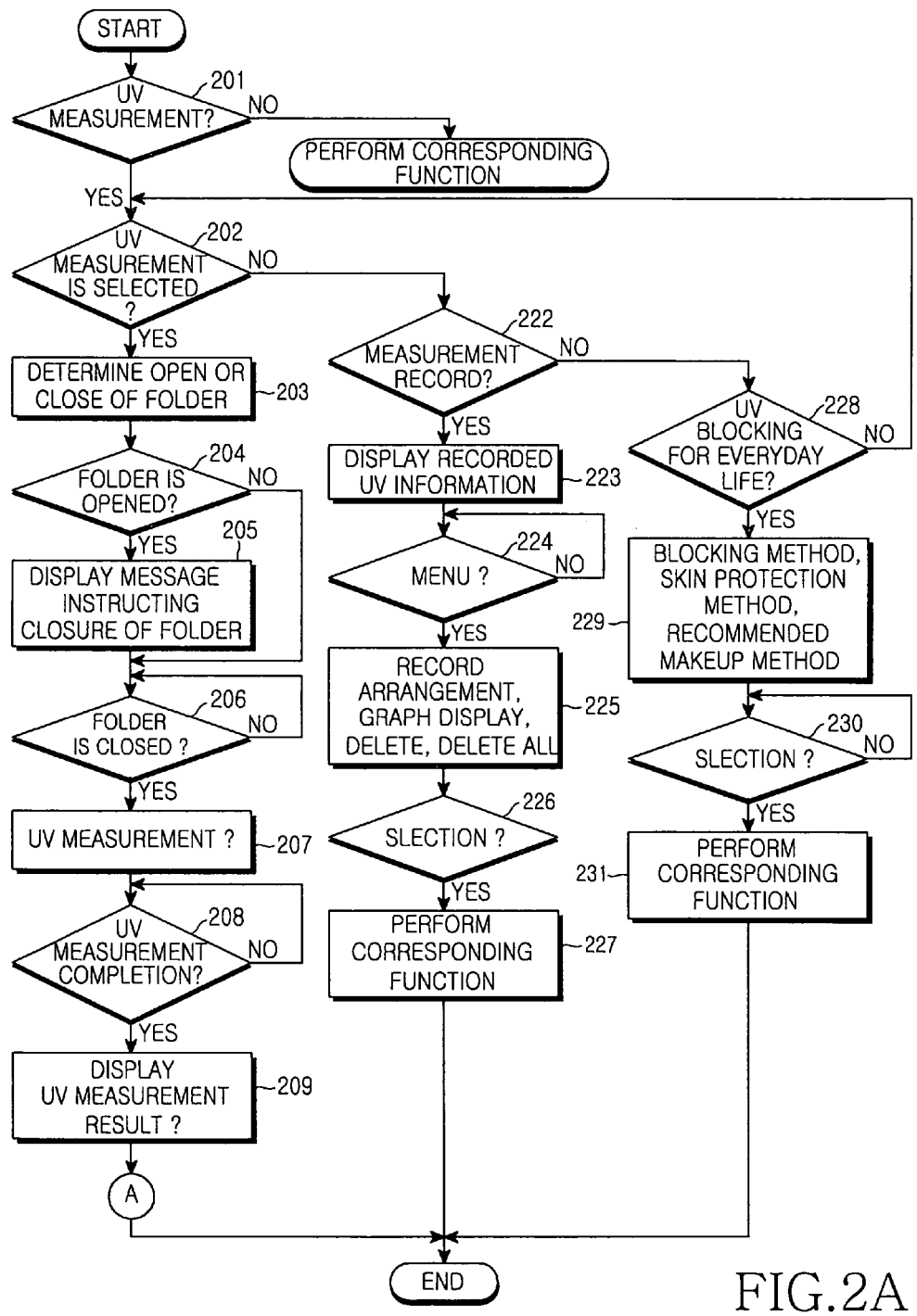
FIGS. 2a and 2b are flow diagrams illustrating a method for controlling ultraviolet light information in a wireless terminal according to an exemplary embodiment of the present invention.
Figure 2B:
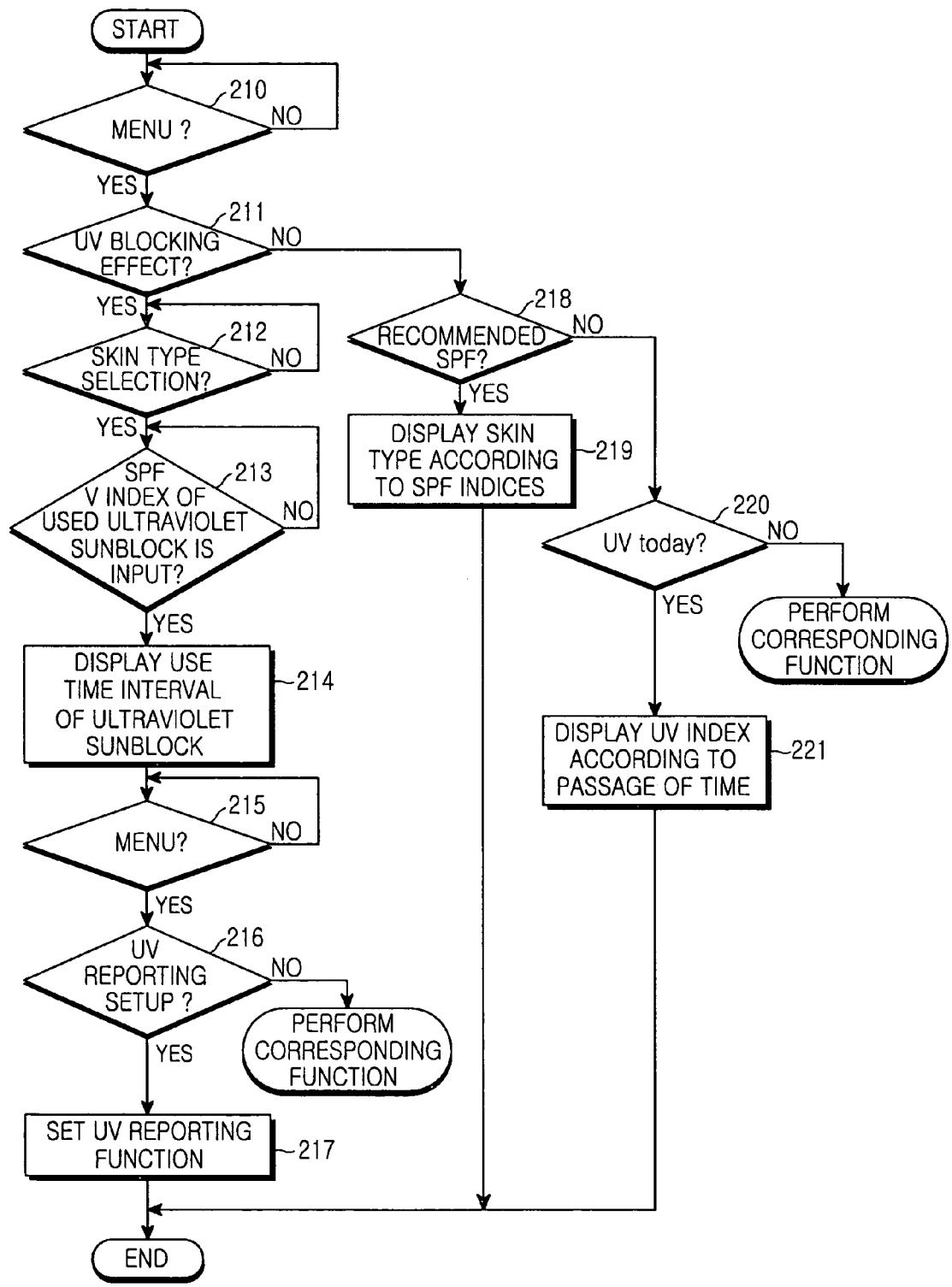

FIGS. 2a and 2b are flow diagrams illustrating a method for controlling ultraviolet light information in the wireless terminal according to the embodiment of the present invention. FIGS. 3a to 3n, FIGS. 4a to 4g and FIGS. 5a to 5d are diagrams illustrating FIG. 2.

Hereinafter, an exemplary embodiment of the present invention will be described in detail with reference to FIG. 1 and FIGS. 3 to 5.

Figure 3A:
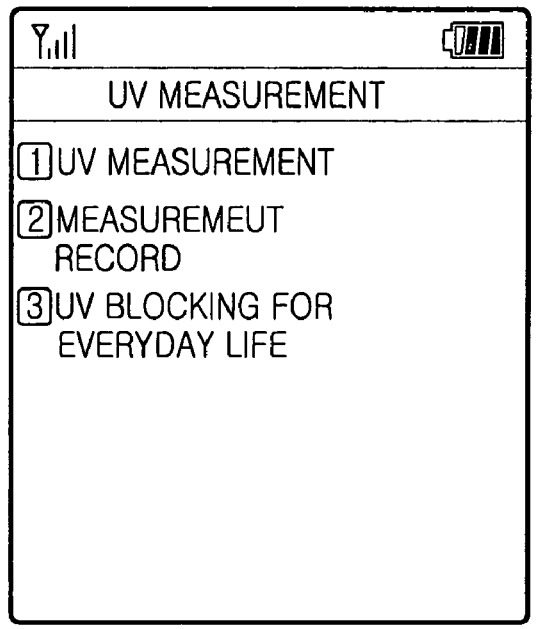
FIGS. 3a to 3n, 4a to 4g and 5a to 5d are diagrams illustrating exemplary implementations of the embodiments shown, for example, in FIG. 2.
Figure 3B:
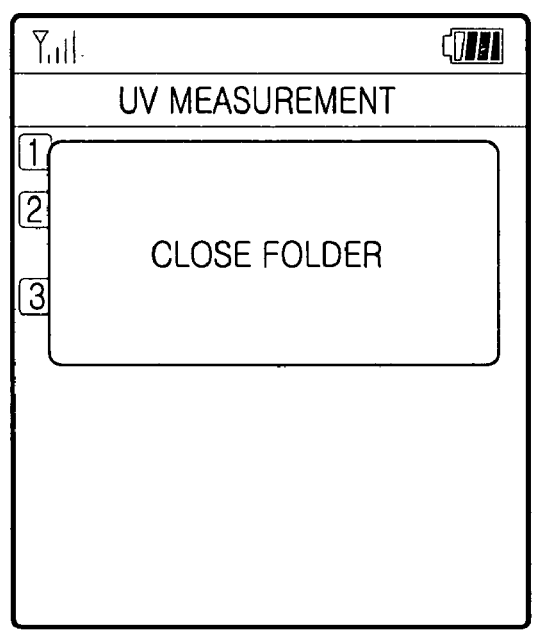

Referring to FIG. 2a, if an ultraviolet light measurement is selected in the wireless terminal, the controller 110 detects the selection of the ultraviolet light measurement in step 201 and switches the mode of the wireless terminal to an ultraviolet light mode, in which an ultraviolet light measurement menu is displayed, as illustrated in FIG. 3a.

First, if "1. ultraviolet light (UV) measurement" is selected in the ultraviolet light mode, the controller 110 detects the selection of the "1. ultraviolet light measurement" in step 202 and determines if the wireless terminal folder has been closed or opened in step 203.

If the wireless terminal folder has been opened, the controller 110 detects the opened state of the folder in step 204 and displays the message "close the folder" on the internal display unit of the display unit 160, which is installed on the inside of the wireless terminal folder, as illustrated in FIG. 3a in step 205.

If the wireless terminal folder has been closed or if the wireless terminal folder is closed after the message is displayed in step 205, the controller 110 detects the closed state of the folder in step 206 and measures the amount of ultraviolet light through the ultraviolet sensor unit 170 installed on the outside of the wireless terminal folder, in step 207. Herein, it is possible to display a message for reporting that the amount of ultraviolet light is being measured on the external display unit of the display unit 160, which is installed on the outside of the wireless terminal folder, as illustrated in FIG. 3c.

If the ultraviolet light measurement is completed in step 207, the controller 110 detects the completion of the ultraviolet light measurement in step 208 and displays ultraviolet light measurement results on the external display unit as illustrated in FIG. 3d in step 209. The external display unit includes an ultraviolet index (UV index:3.9) based on the measured amount of ultraviolet light and a level (for example, normal) measured on a step-by-step basis according to the measured amount of ultraviolet light. In an exemplary embodiment of the present invention, the levels measured on a step-by-step basis according to the measured amount of ultraviolet light may be classified into levels of low (UV index:0~2), normal (UV index:3~4), high (UV index:5~6), and very high (UV index: above 7). In step 209, it is possible to display preset countermeasures for information on a user's skin type according to the ultraviolet light measurement results.

Figure 3E:
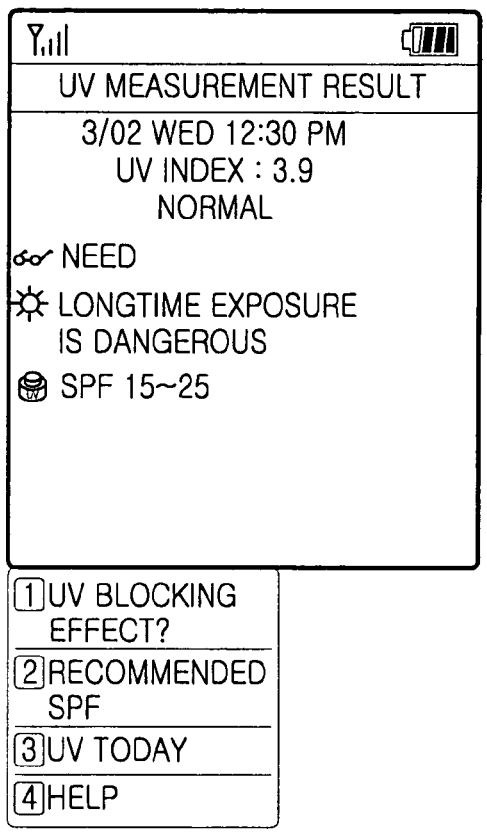

If the folder is opened, the controller 110 detects the opened state of the folder, displays information according to the measured amount of ultraviolet light on the internal display unit, and display preset countermeasures for information on a user's skin type according to the measured amount of ultraviolet light, as illustrated in FIG. 3e. The information on a user's skin type includes information on the skin type, and used Sun Protection Factor (SPF) index information, which may be preset and stored. Further, the countermeasures for information on a user's skin type may include an ultraviolet light blocking method, a skin protection method and a recommended makeup method in addition to a recommended SPF index and the use time interval of an ultraviolet sunblock.

Further, the internal display unit displays the ultraviolet index (UV index:3.9) based on the measured amount of ultraviolet light, a level (for example, normal) measured on a step-by-step basis according to the measured amount of ultraviolet light, and life index information 301 as information according to the ultraviolet index.

The life index information 301 displays required items according to the ultraviolet index by icons, and displays simple text descriptions about the items together with the icons. The descriptions about the items may be displayed by a sliding method.

The life index information 301 displays if required items (for example, sunglasses, a cap, a sunshade) according to the ultraviolet index are needed, displays consideration of the outdoor activity, and displays the SPF index of an ultraviolet sunblock which must be used.

In the life index information 301 of FIG. 3e, "sunglasses are needed", "longtime exposure is dangerous" and "the SPF index of an ultraviolet sunblock" are expressed by icons and texts.

If a menu is selected from the information according to the ultraviolet index displayed on the internal display unit as illustrated in FIG. 3e, the controller 110 detects the selection of the menu in step 210 and displays a first corresponding menu.

Figure 3F:
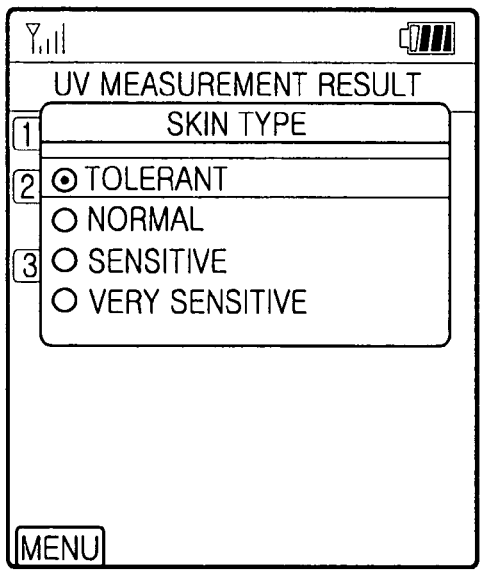

If "1. ultraviolet (UV) light blocking effect" is selected from the first corresponding menu, the controller 110 detects the selection of the "1. ultraviolet light blocking effect" in step 211 and displays skin types as illustrated in FIG. 3f.

Figure 3G:
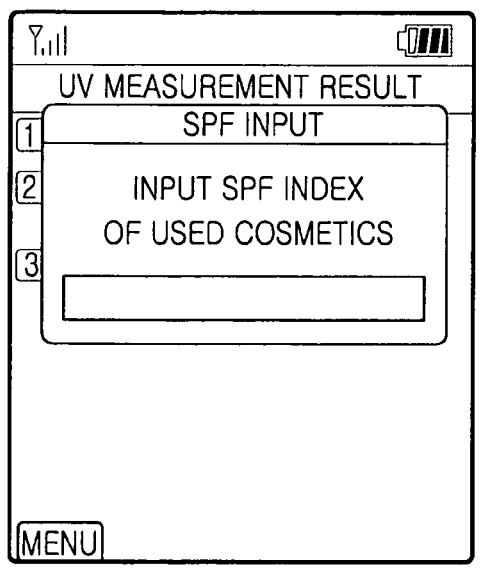
Figure 3H:
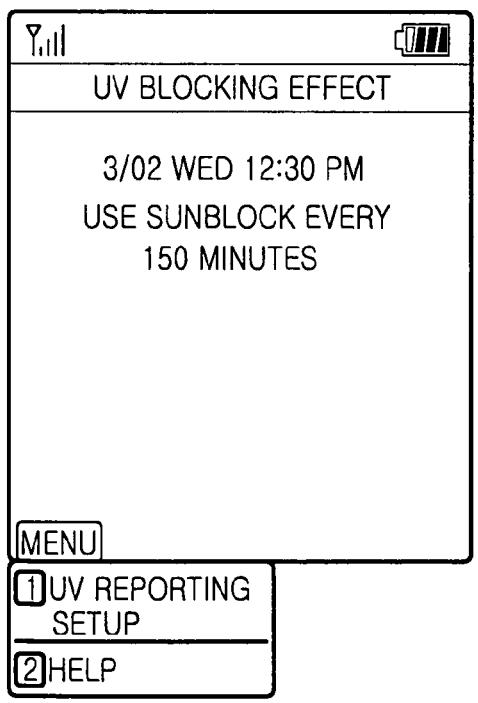

If a corresponding skin type is selected from the displayed skin types, the controller 110 detects the selection of the corresponding skin type in step 212 and requests input of the SPF index of a used ultraviolet sunblock as illustrated in FIG. 3g. The SPF index of the ultraviolet sunblock may include numbers from 1 to 999. When the SPF index is not input, the controller 110 determines that "1" is input.

If the SPF index of the ultraviolet sunblock is input, the controller 110 detects the input of the SPF index in step 213, and computes and displays the use time interval of the ultraviolet sunblock according to skin types in step 214.

Usually, when an ultraviolet sunblock according to skin types is used, the occurrence time of a sunburn is computed by "the occurrence time of a sunburn when an ultraviolet sunblock according to skin types is not used X the SPF index of a used ultraviolet sunblock". Accordingly, in step 214, it is possible to display the use time interval of the ultraviolet sunblock according to skin types by means of both the occurrence time of a sunburn computed through the skin type selected in step 212 and the SPF index selected in step 213.

Figure 3I:
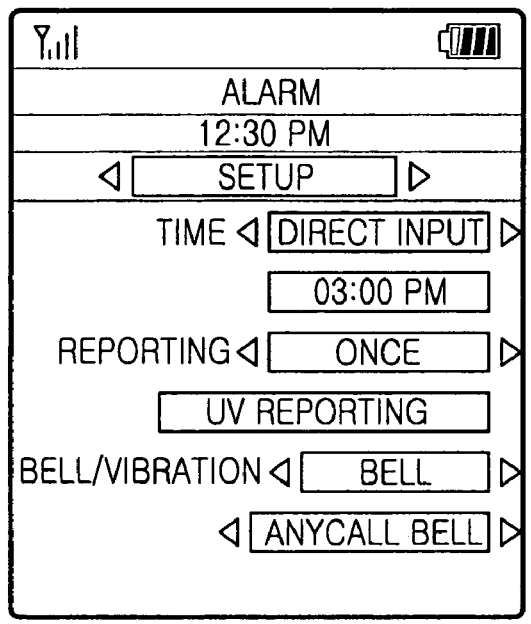

In step 214, if a menu is selected while the use time interval of the ultraviolet sunblock according to skin types is displayed, the controller 110 detects the selection of the menu in step 215 and displays a second corresponding menu. If "1. ultraviolet (UV) light reporting setup" is selected from the second corresponding menu, the controller 110 detects the selection of the "1. ultraviolet (UV) light reporting setup" in step 216 and sets an ultraviolet light reporting function as illustrated in FIG. 3i in step 217.

In step 217, an ultraviolet light reporting time is directly input or selected, a reporting interval is set, reporting content is selected, and a reporting type (for example, ringing sound, vibration) is selected, so that it is possible to set the ultraviolet light reporting time.

Figure 3J:
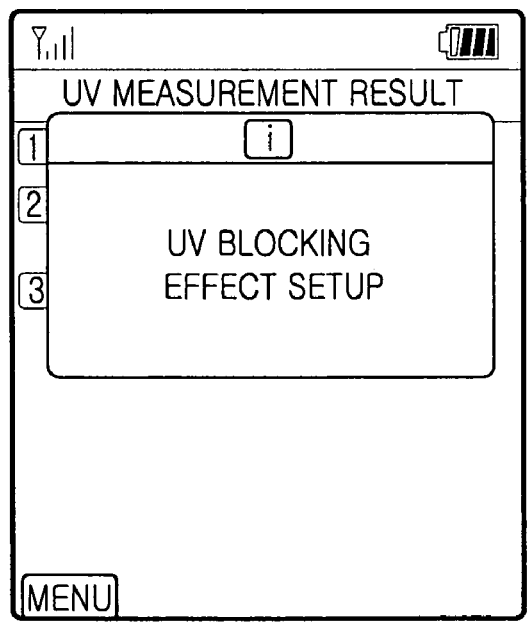

If the setup of the ultraviolet light reporting function is completed in step 217, the controller 110 detects the completion of the setup, and displays that the ultraviolet light reporting function has been set as illustrated in FIG. 3j.

The setup of the ultraviolet light reporting function in step 217 may be performed through selection from the type of the ultraviolet light measurement displayed in FIG. 3e.

Figure 3K:
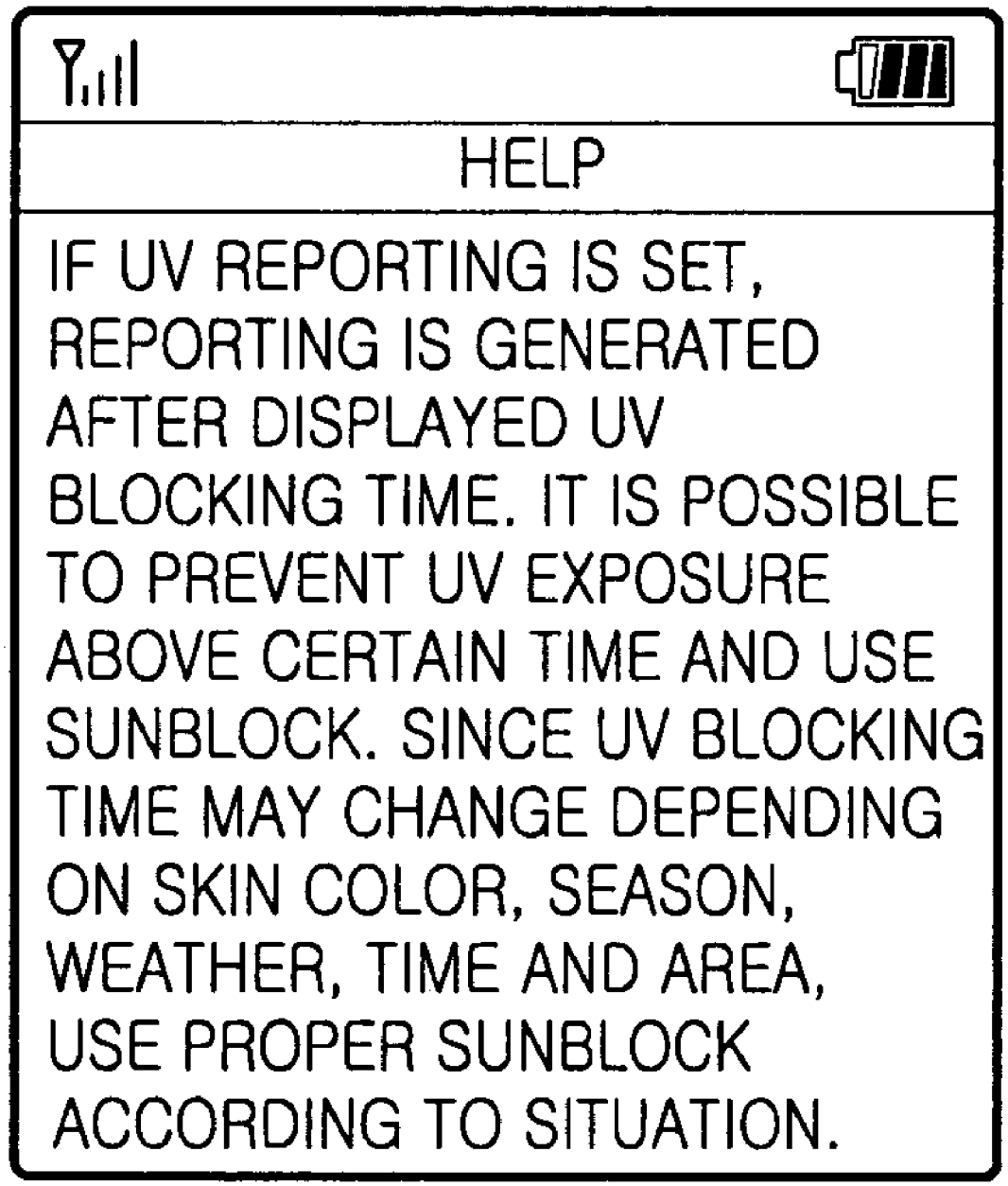

If "2. help" is selected from the second corresponding menu, the controller 110 detects the selection of the "2. help" and displays a help about the ultraviolet light reporting function as illustrated in FIG. 3k.

Figure 3L:
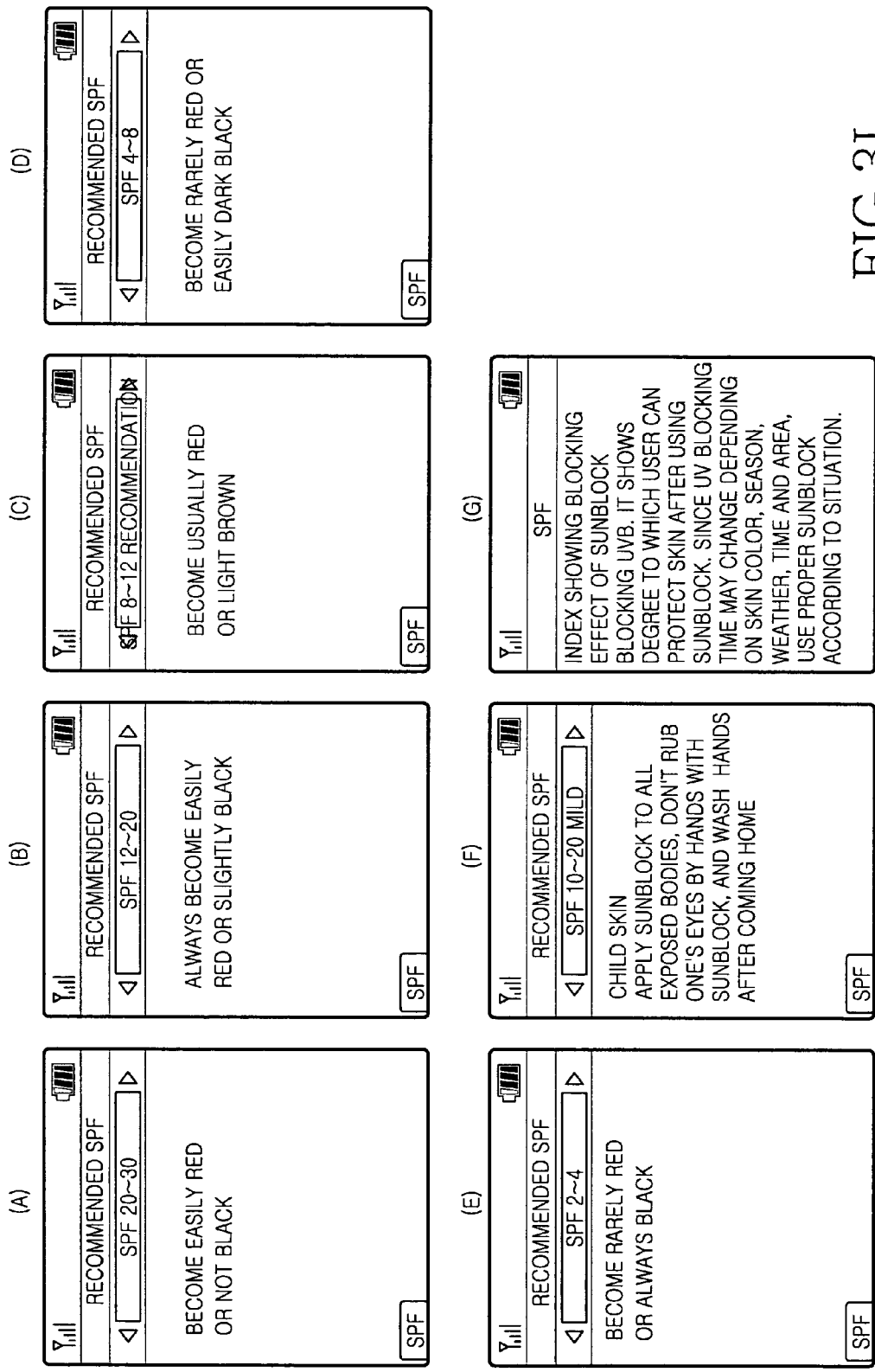

If "2. recommended SPF" is selected from the first corresponding menu, the controller 110 detects the selection of the "2. recommended SPF" in step 218, and displays a corresponding skin type according to SPF indices as illustrated in FIG. 3l in step 219. In FIG. 3l, (a) to (f) may be displayed through selection of a direction key of the key input unit 127. If the "SPF" menu is selected from (a) to (f) in FIG. 3l, the controller 110 detects the selection of the "SPF" menu and displays a help about the SPF as illustrated in FIG. 3lg.

Figure 3M:
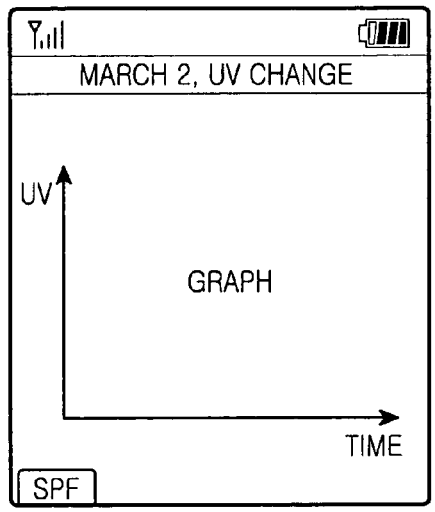

If "3. UV today" is selected from the first corresponding menu, the controller 110 detects the selection of the "3. UV today" in step 220 and displays an ultraviolet index, which is based on the amount of ultraviolet light measured for the current day, according to time in step 221. FIG. 3m is a diagram illustrating the ultraviolet index, which is displayed in step 221, by a graph.

Figure 3N:
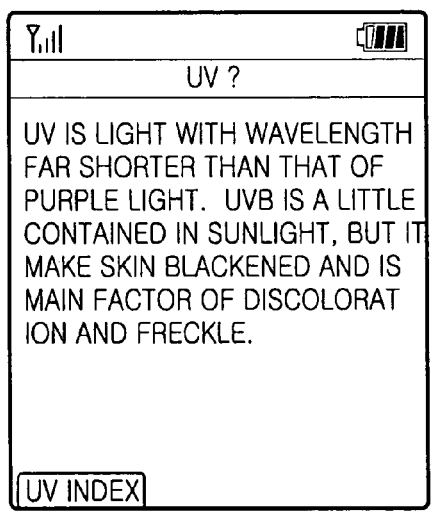
Figure 3N:
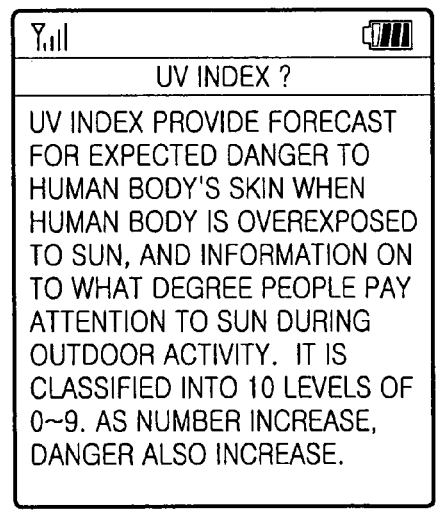

If "4. help" is selected from the first corresponding menu, the controller 110 detects the selection of the "4. help" and displays a help about ultraviolet light and an ultraviolet index as illustrated (a) and (b) in FIG. 3n.

As described above, through steps 202 to 221, it is possible to measure the amount of ultraviolet light, display the ultraviolet index based on the amount of ultraviolet light, display required item information according to the measured amount of ultraviolet light, and retrieve and set corresponding information according to the ultraviolet index.

Figure 4A:
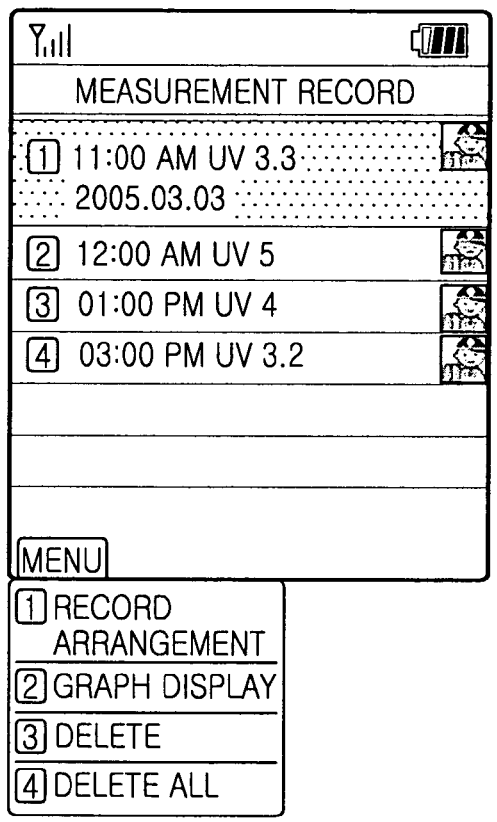

If "2. measurement record" is selected in the ultraviolet light mode of FIG. 3a, the controller 110 detects the selection of the "2. measurement record" in step 222 and displays the type of the ultraviolet light information stored in the memory 130 as illustrated in FIG. 4a in step 223.

Figure 4B:
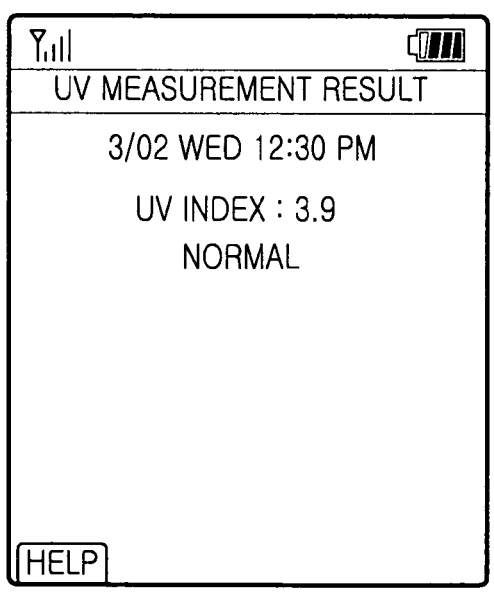

If corresponding ultraviolet light information is selected from the type of the ultraviolet light information displayed in step 223, the controller 110 detects the selection of the corresponding ultraviolet light information and displays the selected ultraviolet light information as illustrated in FIG. 4b.

Figure 4C:
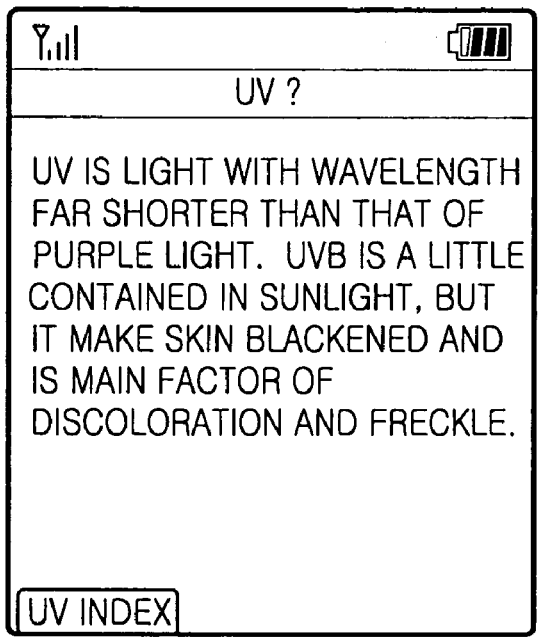
Figure 4D:
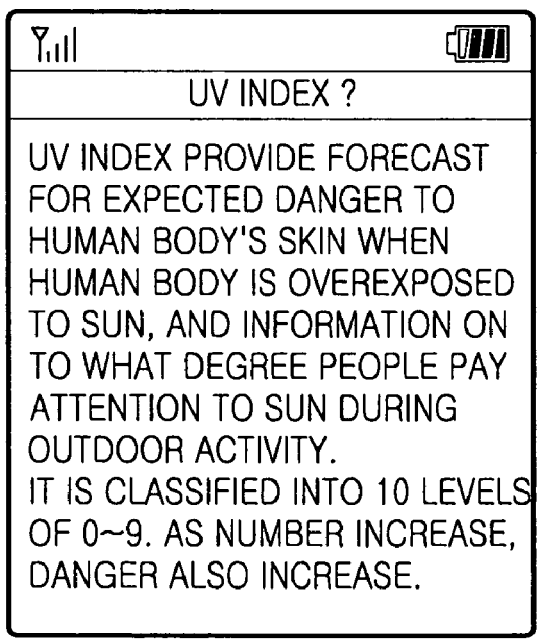

If a "help" menu is selected in FIG. 4b, the controller 110 detects the selection of the "help" menu and displays a help about ultraviolet light and an ultraviolet index as illustrated in FIGS. 4c and 4d.

If a menu is selected while the type of the ultraviolet index information stored in the memory 130 is displayed, the controller 110 detects the selection of the menu in step 224 and displays a third corresponding menu in step 225.

Figure 4E:
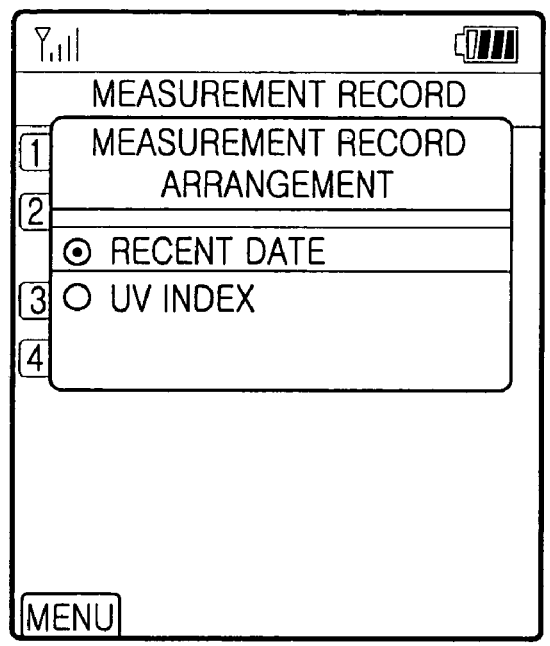
Figure 4F:
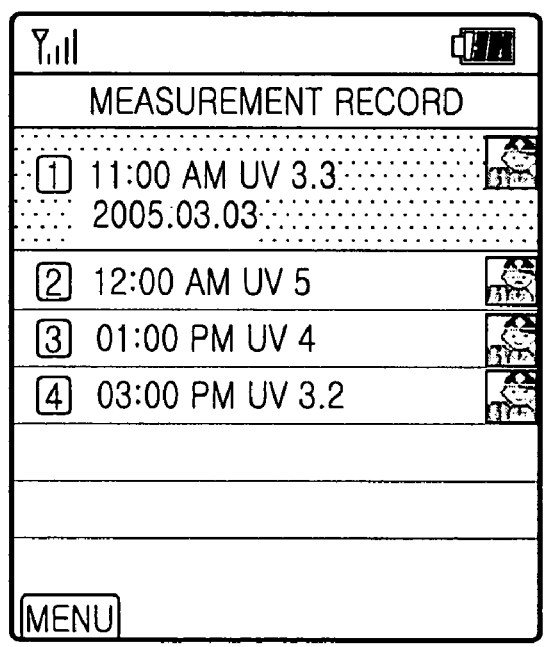

If "1. record arrangement" is selected from the third corresponding menu displayed in step 225, the controller 110 detects the selection of the "1. record arrangement" in step 226 and displays modes for the record arrangement as illustrated in FIG. 4e. If a "recent date" mode is selected for the record arrangement, the controller 110 detects the selection of the "recent date" mode displayed in FIG. 4e, and arranges the type of the ultraviolet light information, which is displayed in step 223, in either a descending order or an ascending order with respect to the "recent date", in step 227.

If a "UV index" mode is selected for the record arrangement, the controller 110 detects the selection of the "UV index" mode displayed in FIG. 4e, and arranges the type of the ultraviolet light information, which is displayed in step 223, in either a descending order or an ascending order with respect to the "UV index", in step 227.

Figure 4G:
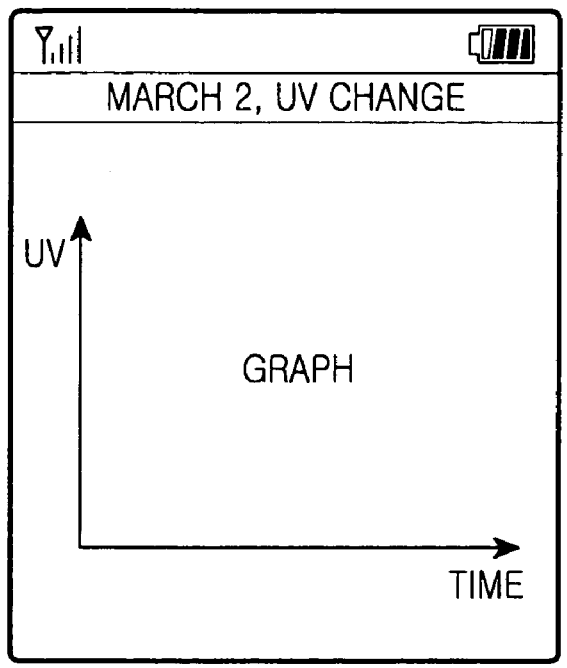

If "2. graph display" is selected from the third corresponding menu displayed in step 225, the controller 110 detects the selection of the "2. graph display" in step 226 and displays the corresponding ultraviolet light information, which has been selected from the ultraviolet light information displayed in step 223, by the graph as illustrated in FIG. 4g, in step 227.

If "3. delete" is selected from the third corresponding menu displayed in step 225, the controller 110 detects the selection of the "3. delete" in step 226 and deletes the corresponding ultraviolet light information, which has been selected from the ultraviolet light information displayed in step 223, in step 227.

If "4. delete all" is selected from the third corresponding menu displayed in step 225, the controller 110 detects the selection of the "4. delete all" in step 226 and deletes all ultraviolet light information, which is displayed in step 223, in step 227.

As described above, through steps 222 to 227, it is possible to arrange and display the ultraviolet light information, which is stored in the memory 130, on the basis of a predetermined arrangement order, display corresponding ultraviolet light information by graph, and delete the ultraviolet light information stored in the memory 130.

Figure 5A:
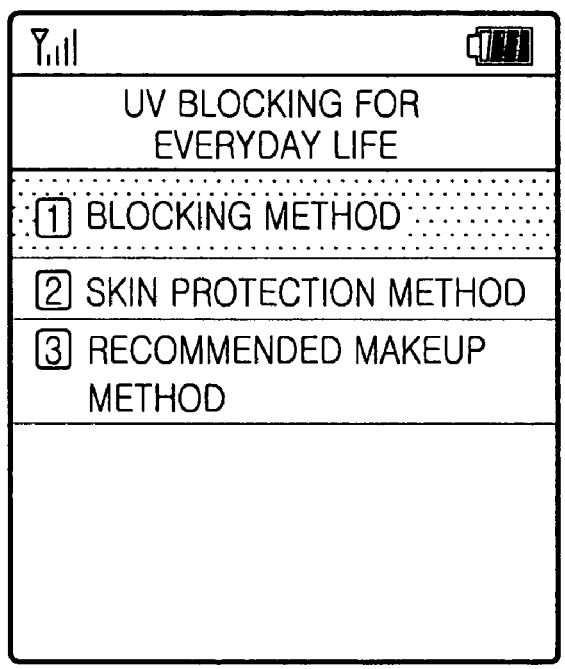

If "3. UV blocking for everyday life" is selected in the ultraviolet light mode of FIG. 3a, the controller 110 detects the selection of the "3. UV blocking for everyday life" in step 228 and displays UV blocking methods as illustrated in FIG. 5a in step 229.

Figure 5B:
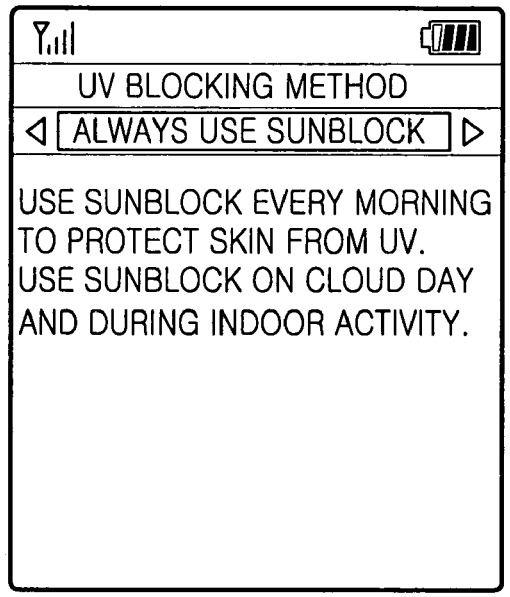
Figure 5B:
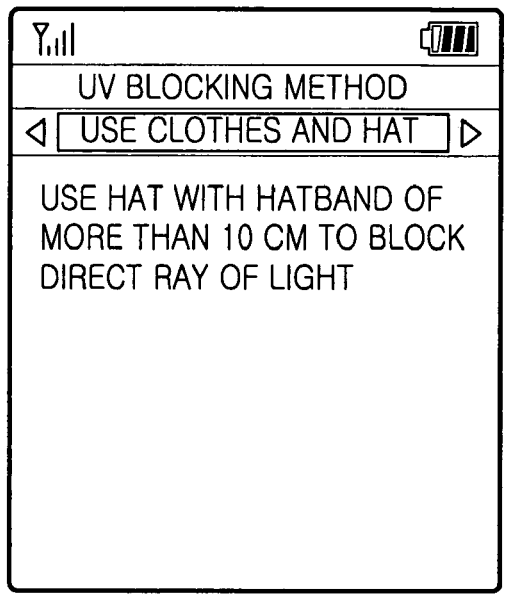
Figure 5B:
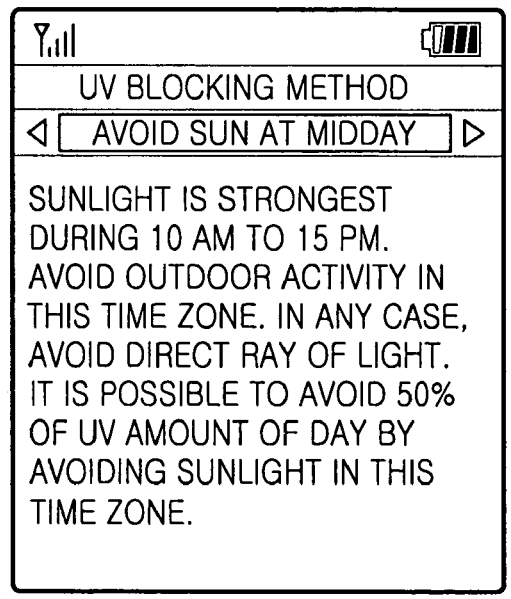
Figure 5B:
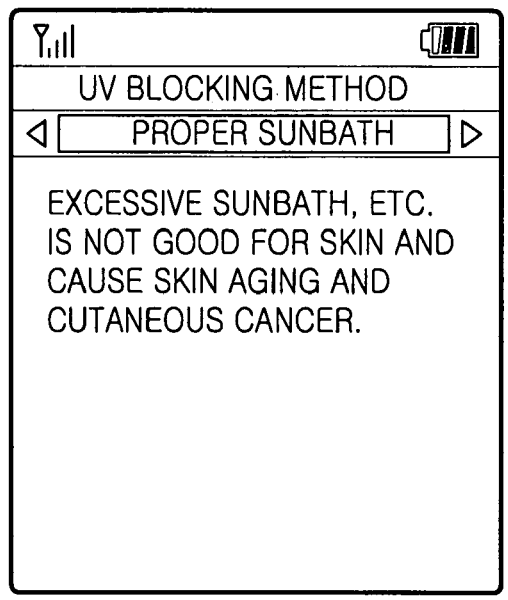

If "1. blocking method" is selected from the type of UV blocking methods displayed in step 229, the controller 110 detects the selection of the "1. blocking method" in step 230 and displays various UV blocking methods as illustrated in (a) to (d) of FIG. 5b, in step 231.

Figure 5C:
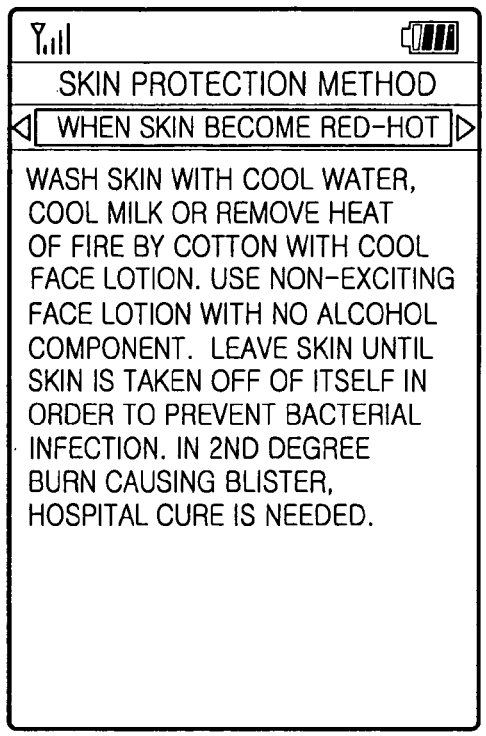
Figure 5C:
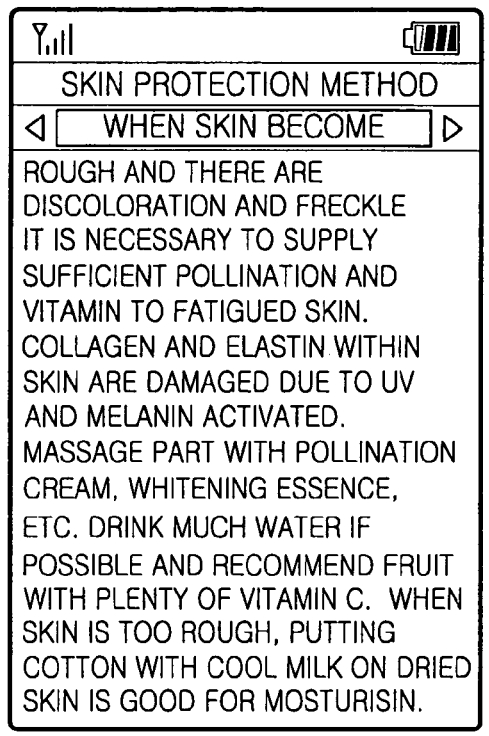

If "2. skin protection method" is selected from the type of UV blocking methods displayed in step 229, the controller 110 detects the selection of the "2. skin protection method" in step 230 and displays various skin protection methods as illustrated in (a) and (b) of FIG. 5c in step 231.

Figure 5D:
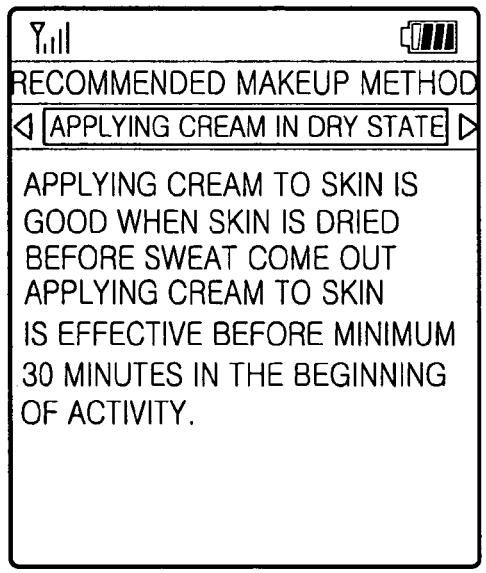
Figure 5D:
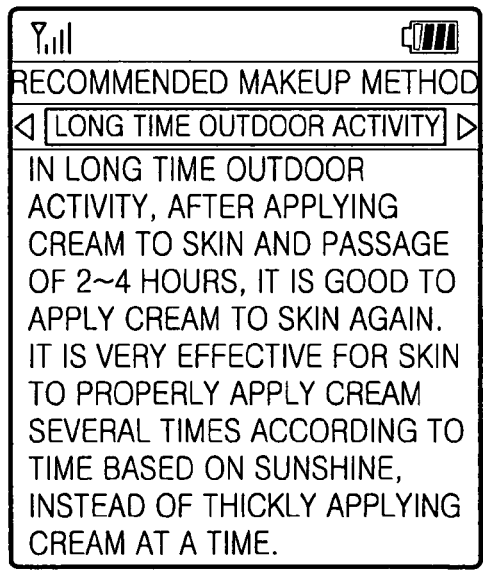

If "3. recommended makeup method" is selected from the type of UV blocking methods displayed in step 229, the controller 110 detects the selection of the "3. recommended makeup method" in step 230 and displays various recommended makeup methods as illustrated in (a) and (b) of FIG. 5d in step 231.

As described above, it is possible to provide countermeasures for blocking ultraviolet light through steps 228 to 231.

As described above, the present invention provides a method for controlling ultraviolet light information in a wireless terminal, thereby displaying an ultraviolet index by means of various information, retrieving and displaying ultraviolet index information stored in the wireless terminal, and providing countermeasures against ultraviolet light.

Although certain exemplary embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for controlling ultraviolet light information in a wireless terminal, the method comprising the steps of:
   when an ultraviolet light measurement is selected in an ultraviolet light mode of a wireless terminal, determining if a folder of the wireless terminal is open or closed;
   when the folder of the wireless terminal is closed, measuring an amount of ultraviolet light; and
   displaying at least one of information on an ultraviolet index based on the measured amount of ultraviolet light and preset countermeasures for information on a user's skin type according to the ultraviolet index.

2. The method as claimed in claim 1, wherein the information on a user's skin type comprises at least one of skin type information and Sun Protection Factor (SPF) index information.

3. The method as claimed in claim 1, wherein the countermeasures for information on a user's skin type comprise at least one of an ultraviolet blocking method, a skin protection method and a recommended makeup method.

4. The method as claimed in claim 1, wherein the countermeasure for information on a user's skin type comprises at least one of a recommended SPF index and a use time interval of an ultraviolet sunblock.

5. The method as claimed in claim 1, further comprising a step of, when the folder of the wireless terminal is open, displaying a message comprising an instruction to close the folder.

6. The method as claimed in claim 1, wherein, when a hot key for the ultraviolet light measurement is input during a time period, the amount of ultraviolet light is measured.

7. The method as claimed in claim 1, wherein the information on the ultraviolet index comprises at least one of an ultraviolet index, levels measured on a step-by-step basis according to the ultraviolet index, and life index information expressed by icons and texts.

8. The method as claimed in claim 1, further comprising the steps of:
   when an ultraviolet blocking effect is selected while the information on the ultraviolet index is displayed, displaying at least one of skin types and an use time interval of a used ultraviolet sunblock according to an SPF index of the ultraviolet sunblock;
   when a recommended SPF is selected while the information on the ultraviolet index is displayed, displaying a type of an SPF index according to skin types; and
   when an ultraviolet index of a current day is selected while the information on the ultraviolet index is displayed, displaying an ultraviolet index according to passage of time for a day.

9. The method as claimed in claim 8, further comprising a step of setting a time for reporting an ultraviolet index when an ultraviolet index reporting is selected while the use time interval of the ultraviolet sunblock is displayed.

10. The method as claimed in claim 1, further comprising the steps of:
    when a measurement record is selected in the ultraviolet light mode of the wireless terminal, displaying the information on the ultraviolet index stored in the wireless terminal;
    when a record arrangement is selected while the information on the ultraviolet index is displayed, arranging and displaying the information on the ultraviolet index according to arrangement modes;
    when a graph display is selected while the information on the ultraviolet index is displayed, displaying an ultraviolet index of a corresponding date by a graph; and
    when a deletion is selected while the information on the ultraviolet index is displayed, deleting information on an ultraviolet index of a corresponding date.

11. The method as claimed in claim 1, further comprising the steps of:
    when an ultraviolet blocking for everyday life is selected in the ultraviolet light mode of the wireless terminal, displaying a type of ultraviolet blocking;
    when a blocking method is selected from the type of ultraviolet blocking, displaying ultraviolet blocking methods;
    when a skin protection method is selected from the type of ultraviolet blocking, displaying skin protection methods according to ultraviolet blocking; and
    when a recommended makeup method is selected from the type of ultraviolet blocking, display makeup methods according to ultraviolet blocking.

12. A method for controlling ultraviolet light information in a wireless terminal, the method comprising the steps of:
    measuring an amount of ultraviolet light in an ultraviolet light mode of the wireless terminal when the folder of the wireless terminal is closed at the time that the ultraviolet light measurement is selected, and displaying corresponding information through an ultraviolet index based on the measured amount of ultraviolet light;
    displaying information on an ultraviolet index, which is stored in the wireless terminal, in the ultraviolet light mode of the wireless terminal; and
    displaying countermeasures against ultraviolet light in the ultraviolet light mode of the wireless terminal.

13. The method as claimed in claim 12, further comprising the step of:
    when the folder of the wireless terminal is open at the time that the ultraviolet light measurement is selected, displaying a message which instructs closure of the folder.

14. The method as claimed in claim 13, wherein, when a hot key for the ultraviolet light measurement is input during a time period, the amount of ultraviolet light is measured.

15. The method as claimed in claim 12, wherein the step of displaying the corresponding information through the ultraviolet index further comprises the sub-steps of:
    when the amount of ultraviolet light is measured, displaying information on an ultraviolet index based on the measured amount of ultraviolet light;
    when an ultraviolet blocking effect is selected while the information on the ultraviolet index is displayed, displaying at least one of skin types and an use time interval of a used ultraviolet sunblock according to an SPF index of the ultraviolet sunblock;
    when a recommended SPF is selected while the information on the ultraviolet index is displayed, displaying a type of an SPF index according to skin types; and
    when an ultraviolet index of a current day is selected while the information on the ultraviolet index is displayed, displaying an ultraviolet index according to passage of time for a day.

16. The method as claimed in claim 15, further comprising a step of setting a time for reporting an ultraviolet index when an ultraviolet index reporting is selected while the use time interval of the ultraviolet sunblock is displayed.

17. The method as claimed in claim 12, wherein the step of displaying the information on the ultraviolet index stored in the wireless terminal further comprises the sub-steps of:
- when a measurement record is selected in the ultraviolet light mode of the wireless terminal, displaying the information on the ultraviolet index stored in the wireless terminal;
- when a record arrangement is selected while the information on the ultraviolet index is displayed, arranging and displaying the information on the ultraviolet index according to arrangement modes;
- when a graph display is selected while the information on the ultraviolet index is displayed, displaying an ultraviolet index of a corresponding date by a graph; and
- when a deletion is selected while the information on the ultraviolet index is displayed, deleting information on an ultraviolet index of a corresponding date.

18. The method as claimed in claim 12, wherein the step of displaying the countermeasures against ultraviolet light further comprises the sub-steps of:
- when an ultraviolet blocking for everyday life is selected in the ultraviolet light mode of the wireless terminal, displaying a type of ultraviolet blocking;
- when a blocking method is selected from the type of ultraviolet blocking, displaying ultraviolet blocking methods;
- when a skin protection method is selected from the type of ultraviolet blocking, displaying skin protection methods according to ultraviolet blocking; and
- when a recommended makeup method is selected from the type of ultraviolet blocking, display makeup methods according to ultraviolet blocking.

19. A wireless terminal comprising:

an ultraviolet sensor unit:

a controller; and a display unit;

a memory unit for storing information on an ultraviolet index, wherein the controller controls the ultraviolet sensor unit to measure an amount of ultraviolet light when in an ultraviolet light mode, the controller controls the displaying of corresponding information on the display unit through the ultraviolet index based on the measured amount of ultraviolet light, and the controller controls the displaying of countermeasures against ultraviolet light in the ultraviolet light mode based on the measured amount of ultraviolet light.

* * * * *